(12) United States Patent
Bazinski et al.

(10) Patent No.: US 9,346,201 B2
(45) Date of Patent: May 24, 2016

(54) PLASTIC PART WITH REDUCED READ-THROUGH

(71) Applicant: Ford Global Technologies, LLC, Dearborn, MI (US)

(72) Inventors: Steve Norman Bazinski, Amherstburg (CA); Warwick J. Smith, Grosse Point Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/489,784

(22) Filed: Sep. 18, 2014

(65) Prior Publication Data

US 2016/0082630 A1   Mar. 24, 2016

(51) Int. Cl.
*B62D 29/04* (2006.01)
*B29C 45/00* (2006.01)
*B60R 13/02* (2006.01)
*B29C 45/44* (2006.01)
*B29C 45/40* (2006.01)

(52) U.S. Cl.
CPC ............. *B29C 45/0025* (2013.01); *B29C 45/44* (2013.01); *B60R 13/0206* (2013.01); *B29C 2045/4063* (2013.01)

(58) Field of Classification Search
CPC ................ B29C 45/0025; B29C 45/44; B29C 2045/4063; B60R 13/0206
See application file for complete search history.

(56) References Cited

U.S. PATENT DOCUMENTS

| 2,947,226 | A | 8/1960 | Walter |
| 4,452,420 | A | 6/1984 | Lundquist |
| 4,576,568 | A | 3/1986 | Grannen, III |
| 4,820,149 | A | 4/1989 | Hatakeyama et al. |
| 5,368,467 | A | 11/1994 | Kleyn |

*Primary Examiner* — Lori L Lyjak
(74) *Attorney, Agent, or Firm* — Vichit Chea; Price Heneveld LLP

(57) ABSTRACT

A vehicle interior panel includes a substrate having an interior surface and an exterior surface. An attachment structure extends integrally from the interior surface of the substrate. The attachment structure defines a first wall spaced apart from the substrate and having an attachment opening therethrough. The attachment structure further defines a supporting wall segment adjacent the substrate that has a plurality of holes therein, the holes extending in a first direction generally parallel with the interior surface of the substrate.

8 Claims, 6 Drawing Sheets

PLASTIC PART WITH REDUCED READ-THROUGH

FIELD OF THE INVENTION

The present invention generally relates to injection-molded panels for a vehicle interior. In particular, the panel includes hidden attachment features with holes therein to reduce sink or read-through on a visible surface thereof. The present invention further relates to an apparatus and method for making such panels.

BACKGROUND OF THE INVENTION

Vehicle interiors may generally include a number of trim elements in the form of injection-molded panels or inserts that are attached over various internal or structural components of the vehicle. Such panels may provide a finished appearance for the vehicle interior by covering the structural or internal components of the vehicle from view. Such panels are often attached to the structural vehicle element that they conceal, which may be achieved by one or more specifically-structured features of the panel that are integral with the side thereof opposite the visible surface. Such features may be of the type generally referred to as a "dog house," which may define a multi-walled structure extending from a surface of the panel to contact the feature to which the panel is to be attached. Dog houses are generally configured to receive a mechanical fastener or to provide a surface on which adhesive can be applied to couple the dog house, and thus the panel, to the structural vehicle component.

Because the panels and various dog houses are integrally injection-molded in a single piece, part sink or read-through may occur in the area of dog houses, making their locations visible on the surface of the panel opposite the dog house, otherwise referred to as the "class-A" surface. This occurs because the molten plastic used to injection mold the panel shrinks as it cools. When the plastic forming the dog house shrinks, it pulls on the adjacent portion of the panel body, resulting in a depression on the opposite, class-A, surface, in a location that is visible to the customer.

Various modifications to dog house structures have been made in an effort to reduce read-though on finished part surfaces. In general, such modifications have involved thinning of the various walls of the dog house in an effort to reduce material. However, such thinning may weaken the structure of the dog house, adversely affecting the strength of the attachment to the associated structural vehicle element. Accordingly, further advances in such read through reduction are desired.

SUMMARY OF THE INVENTION

According to one aspect of the present invention, a vehicle interior panel includes a substrate having an interior surface and an exterior surface. An attachment structure extends integrally from the interior surface of the substrate. The attachment structure defines a first wall spaced apart from the substrate and having an attachment opening therethrough. The attachment structure further defines a supporting wall segment adjacent the substrate that has a plurality of holes therein, the holes extending in a first direction generally parallel with the interior surface of the substrate.

According to another aspect of the present invention, a mold assembly includes a first mold portion defining a cavity having a first wall with an edge and a second mold portion defining a surface positionable at a predetermined distance from the edge. A lifter is positionable within the cavity and is spaced apart from the first wall and the surface, the lifter including a plurality of pins extending toward the first wall and aligned in a first direction generally parallel with the edge.

According to another aspect of the present invention, a method for manufacturing a vehicle panel includes injecting molten plastic into a mold to partially surround a lifter positioned within a cavity defined between first and second mold parts so as to include surrounding a plurality of pins extending from the lifter toward a wall of the cavity. The method also includes cooling the molten plastic into the panel and removing the panel from the mold at least by movement of the lifter from out of the cavity.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
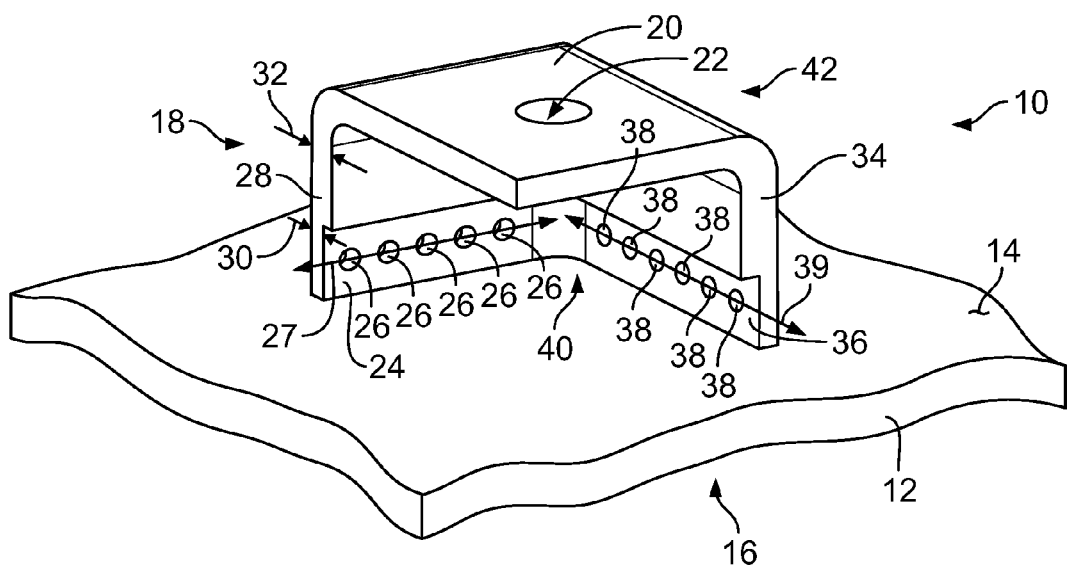
FIG. 1 is a perspective view of a portion of a panel for assembly within an interior of a vehicle, including an attachment structure formed therewith.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the Figures, where like reference numerals indicate similar features, FIGS. 1-4 show a panel 10 for use in a vehicle interior. Panel 10 includes a substrate 12 having an interior surface 14 and an exterior surface 16 spaced apart from the interior surface 14. Panel 10 also includes an attachment structure 18 extending integrally from the interior surface 14 of a substrate 12 and defining a first wall 20 spaced apart from the substrate 12 and having an attachment opening 22 therethrough. Attachment structure 18 further includes a supporting wall segment 24 adjacent the substrate 12 and having a plurality of holes 26 therein. Holes 26 extend in a first direction 27 generally parallel with the interior surface 14 of substrate 12.

Figure 3:
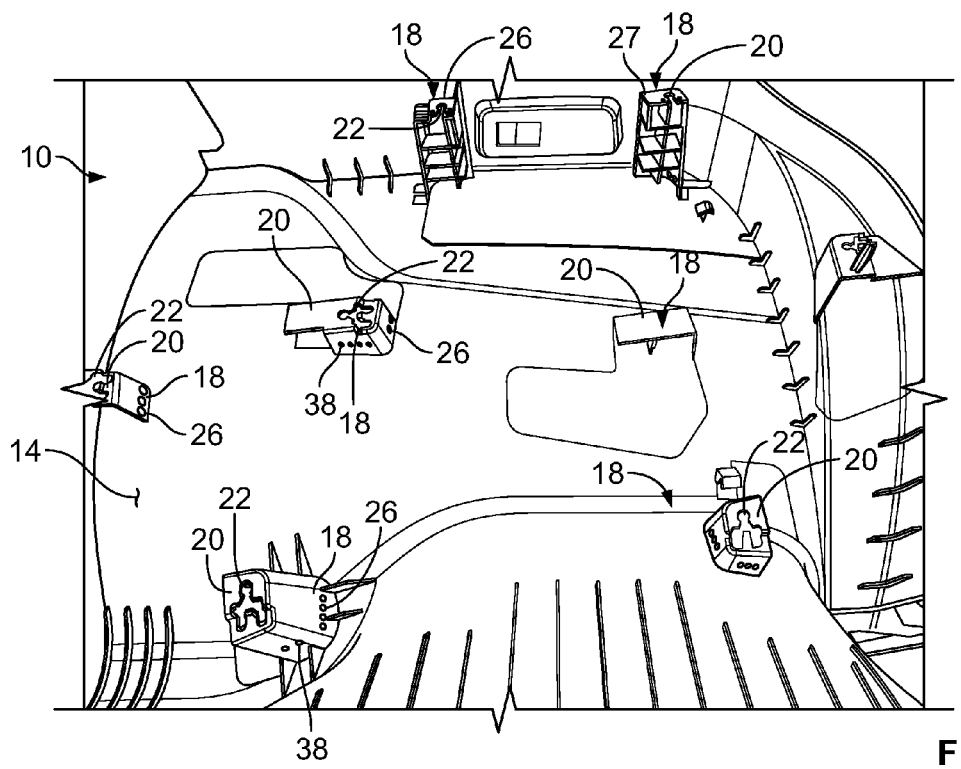
FIG. 3 is an elevational view of an interior surface of a panel that can include an attachment structure as shown in FIG. 1.
Figure 4:
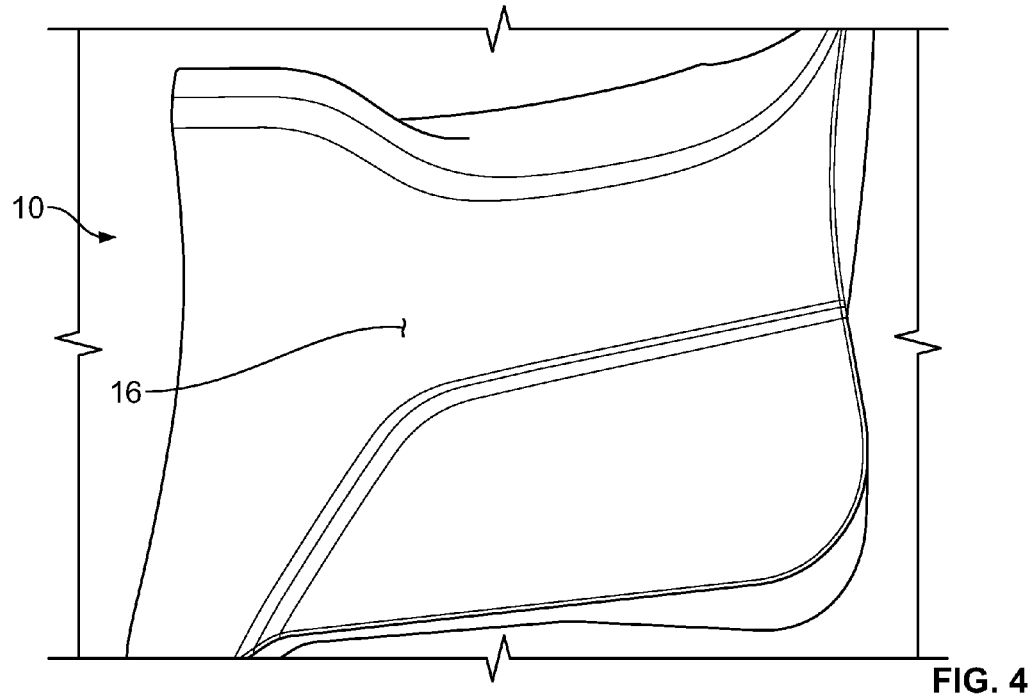
FIG. 4 is an elevational view of an exterior surface of the panel of FIG. 3.

As shown in FIGS. 3 and 4 panel 10 can be structured for use within the interior of a vehicle (not shown in the Figures) and can be attached over various internal or structural components of the vehicle so as to give a finished appearance to the interior thereof. As such, exterior surface 16, as shown in FIG. 4, may be visible to an occupant of the vehicle from within the interior thereof, and may be shaped so as to provide a visually consistent surface for an appropriately finished appearance for the interior of the vehicle. The shape of interior surface 14 follows that of exterior surface 16, giving substrate 12 a generally uniform thickness and, thus, may vary from that of the internal or structural features which panel 10 is intended to conceal. Accordingly, interior surface 14 may not directly contact the portions of the vehicle to which panel 10 is intended to be attached.

Several attachment structures 18 may be integrally formed with panel 10 so as to extend from various locations along interior surface 14 of panel 10. Such attachment structures 18 may be configured to provide appropriate number of points of contact between panel 10 and the corresponding features to which panel 10 is intended to be affixed. Accordingly, the different attachment structures 18 included on panel 10 may differ in their particular structure according to various modes, including height, number of sides, the presence of supporting ribs, or the like. Regardless of the possible variations among the various attachment structures 18, each attachment structure 18 is of the type that may be generally referred to as a "dog house", which is used to provide mechanical attachment of the panel 10 to an associated portion of the vehicle without such attachment being visible from the exterior surface 16. Accordingly, each attachment structure 18 is structured such that first wall 20 is spaced apart from interior surface 14 at least by a distance suitable to receive a fastener (not shown) in attachment opening 22. Such mechanical fasteners may include threaded nuts or other inserts, or various forms of press-fit clips, such as 2- or 4 prong w-clips. Such mechanical fasteners may provide for a means of attachment of panel 10 to a corresponding portion of the vehicle by a snap-fit arrangement or by assembly with a mechanical fastener that can be operated from a side of the associated vehicle portion opposite panel 10.

Returning to FIGS. 1 and 2, an example of an attachment structure 18, which may be one of the plurality of attachment structures 18 shown in FIG. 3, is shown having a basic structure thereof, which may vary according to the particular location along substrate 12, the particular vehicle panel, the type of mechanical fastener used in connection therewith, or the type of mechanism used to form the particular attachment feature. The example of attachment structure 18 shown includes a pair of sidewalls, in the form of second wall 28 and third wall 34, both of which contribute to the spacing of first wall 20 apart from substrate 12. In a variation, a fourth wall may be present opposite either second wall 28 or third wall 34, and may extend wholly of partially along an adjacent portion of first wall 20. In a further variation, a single, second wall may extend in a shape similar to a section of a cylinder or a steep cone such that the single wall provides support for first wall 20 along multiple sides thereof. As shown each of second wall 28 and third wall 34 (when present) include respective supporting wall segments 24 and 36, which are in the form of thinned portions of the respective walls 28 and 34.

Supporting wall segments 24 and 36 may be thinner than the remaining portions of the associated second wall 28 and third wall 34 so as to have respective thicknesses of, for example, between about 40 percent and 80 percent of the thickness of the respective walls 28 and 34. In a further example, supporting wall segments 24 and 36 may be up to about 30 percent thinner than respective walls 28 and 34. The reduced thickness 30 of the supporting wall segments 24 and 36, can both to material reduction in such an area, which as mentioned above, can reduce material shrinkage during the step of material cooling in the manufacture of panel, as discussed further below, for vehicle interior panels, such as panel 10, which may be injection-molded of a single piece of plastic or other polymeric material. Reduced material shrinkage can, in turn, reduce the presence of visible variations in exterior surface 16 corresponding to the location of attachment structure 18, which may be referred to as "read through"

Holes 26, which may extend entirely through, or partially through, supporting wall segment 24 can further contribute to a material reduction within attachment structure 18 adjacent substrate 12, which may further reduce visible read-through at exterior surface 16. The presence of holes 26 within attachment structure 18 further reduces the amount of material within the portion of attachment structure 18 adjacent to substrate 12. Such reduction can be beyond what can be reliably achieved by the incorporation of supporting wall segment 24. In a variation of the attachment structure described herein, first wall 20 can be directly supported above substrate 12 by supporting wall segment 24 with holes 26 therein without a reduction in wall thickness, holes 26 providing for reduction in material adequate to reduce read-through. An additional set of holes 38 can be present within supporting wall segment 36, which can extend in a second direction 37 that is also generally parallel to interior surface 14 and generally perpendicular to first direction 27. Although shown as generally circular or cylindrical, holes 26 may take on any acceptable shape to reduce the material within the portion of attachment structure 18 adjacent substrate 12. For example, rectangular or rounded rectangular holes can be used, as can triangular, rounded triangular, or any other acceptable geometric form, including elongated slots or the like.

In various examples the number and size of holes 26 and/or holes 38, which may be included in supporting wall segment 36 extending in direction 39 parallel to interior surface 14 and perpendicular to direction 27, can vary according to a number of factors. Such factors may include the thickness 32 of walls 28 and 34, the thickness 30 of the supporting wall segments 24 and 36, the particular shape of holes 26 and 38, as well as the overall dimensions of attachment structure 18, including the length and height of walls 28 and 34. In an example, holes 26 and 38 may be sized so as to reduce the material within the respective supporting wall segments 24 and 36 by between about 20 percent and 50 percent, and in one embodiment by about 40 percent. In another example the dimension of holes 26 and 38 in lateral directions 27 or 39, for example the diameter of the round holes 26 and 38 illustrated, can be related to the thickness 30 of the associated supporting wall segment 24 and 36. In such an example, the holes 26 and 38 can be sized with a diameter (or other lateral dimension) that is between about 80 percent and 150 percent of the thickness 30 of the associated supporting wall segments 24 or 36. Similarly, the spacing between holes 26 and 38 can be such that sufficient strength of attachment structure 18 is maintained and can be such that adjacent ones of holes 26 or 38 can be spaced apart, on-center, by between about 150 percent and 300 percent of the diameters (or other lateral dimensions) of holes 26 or 38. The number of holes 26 or 38 present on the associated supporting wall segment 24 or 36 can follow from configuration according to the above factors.

Figure 2:
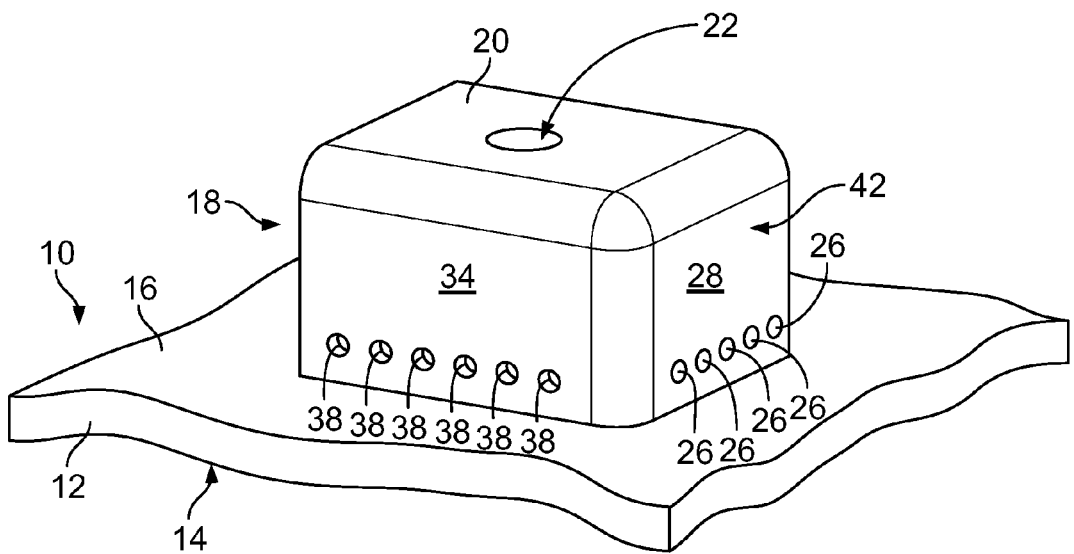
FIG. 2 is an alternative perspective view of the panel of FIG. 1.
Figure 5:
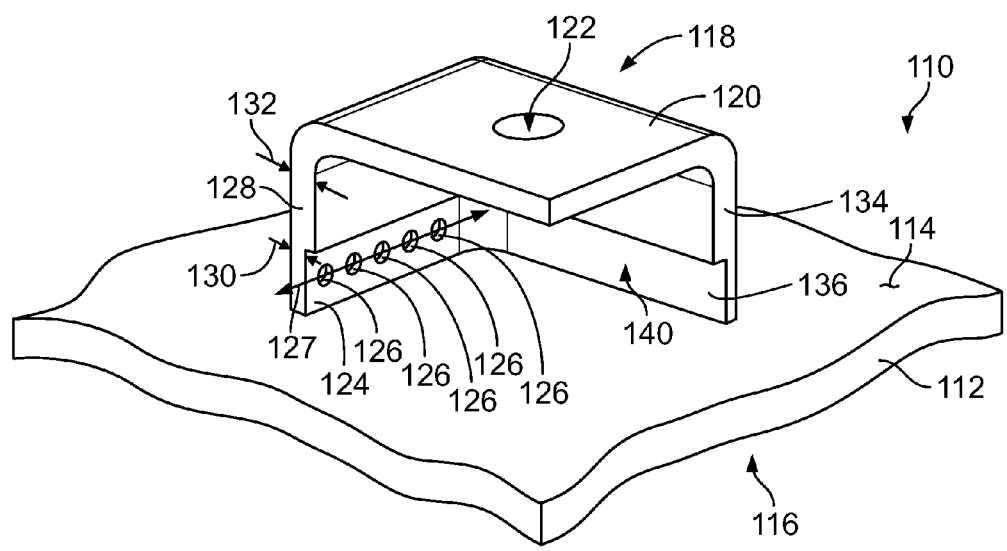
FIG. 5 is a perspective view of a portion of a panel for assembly within an interior of a vehicle, including an alternative attachment structure formed therewith.
Figure 6:
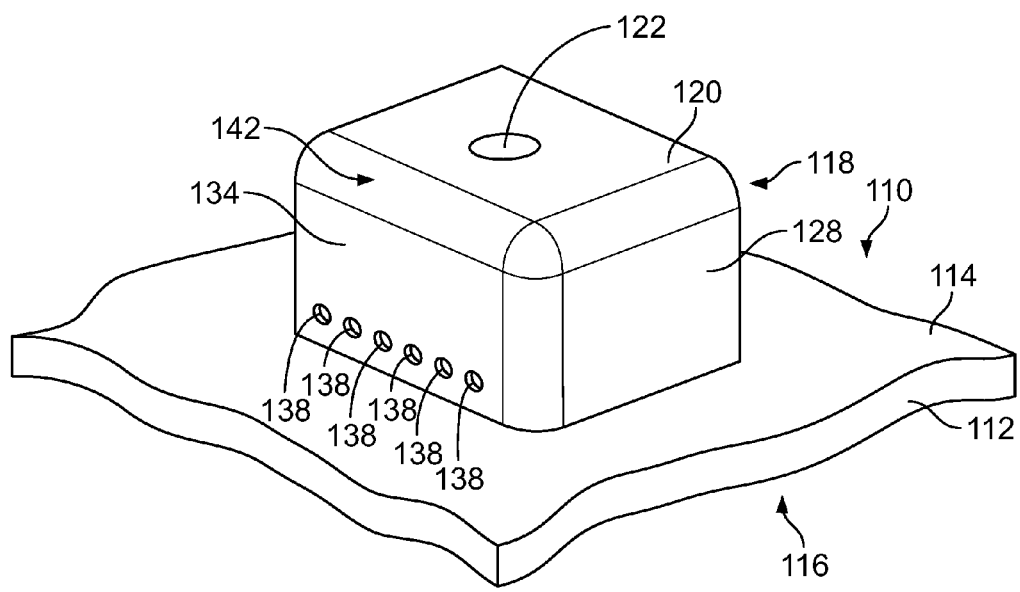
FIG. 6 is an alternative perspective view of the panel of FIG. 5.

Further examples of an attachment structure similar to that which is shown in FIGS. 1 and 2 can include only one set of holes 26 or 38 on only one of the supporting wall segments 24 or 36 or can include an additional wall extending between substrate 12 and first wall 20 with an associated supporting wall segment and a respective set of additional holes. A still further example of a variation of an attachment structure 118 is shown in FIGS. 5 and 6 and can be included on a panel 110, which can be similar to panel 10 shown in FIGS. 3 and 4. Attachment structure 118 is shown including respective sets of holes 126 and 138 along supporting wall segments 124 and 136 that are configured as blind holes (i.e. not extending entirely through the respective supporting wall segment 124 or 136). In an embodiment, blind holes 126 or 138 can extend to a depth of between about 30 percent and 80 percent of the thickness of the respective supporting wall segments 24 and 36. In a particular embodiment, blind holes 126 and 138 can extend through the respective supporting wall segments 124 and 136 by about 50 percent of the thicknesses thereof. The diameters and spacing of holes 126 and 138 can be configured in a manner similar to that which is discussed above with respect to FIGS. 1 and 2, but may, in some examples, be configured with a larger diameter (e.g. between about 100 percent to 200 percent) compared to the thickness 30 of the respective supporting wall segments 124 and 136. Similarly holes 126 and 138 may be spaced closer together (e.g. by as close to about 120 percent of the diameter of the respective holes 126 and 138, measured from center-to-center). As further shown in FIGS. 5 and 6, holes 126 and 138 may be open on opposite sides (i.e. from the side of supporting wall segment 124 on an interior 140 of attachment structure 18 or on a side of supporting wall segment 136 on an exterior 142 of attachment structure 118). Such a configuration may be influenced by the particular mold used for making attachment structure 118, and in particular method of manufacturer therefor. In either variation, it is noted that holes 126 and 138 can have a shape other than the circular shapes illustrated, such as any of the alternative shapes discussed above.

A portion of a mold assembly 44 that can be used to manufacture a panel such as panel 10, including one or more of a variation of the attachment structures 18 or 118 described above, is shown in FIG. 7. In particular, the attachment structure 18 or 118 that can be made with mold assembly 44 includes a single set of holes 26 along supporting wall segment 24 of second wall 28, without holes associated with third wall 34. The portion of mold assembly 44 shown in FIGS. 7 through 11 can be repeated and adapted to produce a number of differently configured variations of molds corresponding to variations of panels for various portions of a vehicle interior with varying locations and sizes of attachment structures 18 or 118, as well as various shapes of attachment structures 18 or 118. Mold assembly 44 includes a first mold portion 46 that defines a major surface 48 that may generally correspond to the desired shape for interior surface 14 of panel 10, for example. First mold portion 46 includes a cavity 50 open to major surface 48 that may generally correspond to the desired shape for the exterior 42 of attachment structure 18, including the positioning of first wall 20 and the desired spacing therefrom relative to interior surface 14 of panel 10, for example. Cavity 50 defines a first wall 52 and a second wall 54, which may, for example, correspond to the portions of second wall 28 and third wall 34 along the exterior 42 of attachment structure 18. A second mold portion 56 defines a major surface 58 that may be shaped to generally correspond to the desired exterior surface 16 of panel 10, for example, and is configured to be spaced apart, at least along a portion thereof, from major surface 48 of first mold portion 46 so as to define a thickness of substrate 12.

Figure 8:
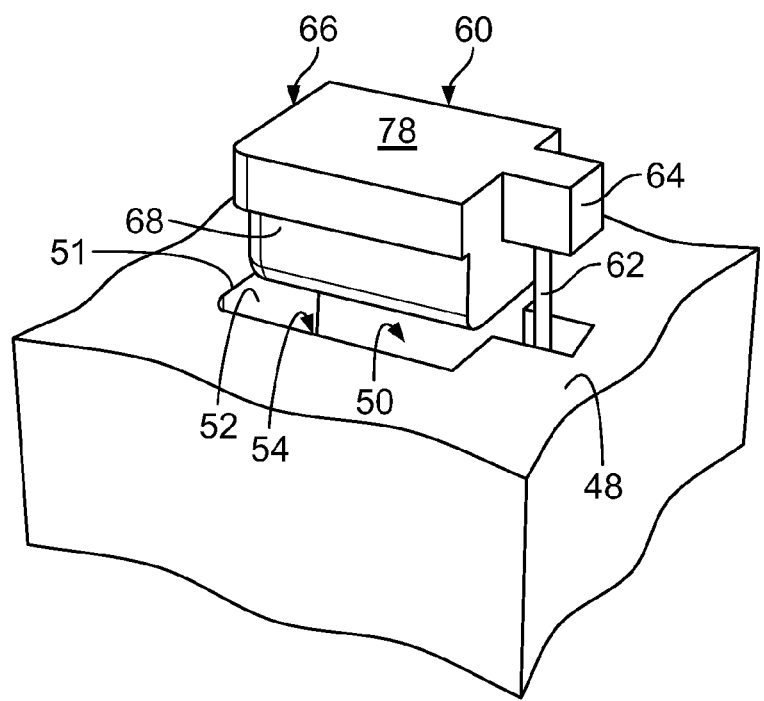
FIG. 8 is a perspective view of the mold portion of FIG. 7 in a further configuration.

Mold assembly 44 further includes a lifter 60 that fits within cavity 50 and is configured to define the interior 40 of attachment structure 18. Lifter 60 is configured to be moveable in and out of cavity 50, as shown in FIG. 8, such movement being driven by an actuator 62 that is coupled with a mount 64 that extends from a portion of lifter 60 (and may be received within an additional section of cavity 50). The moveable configuration of lifter 60 with respect to cavity 50 allows for the formation of the undercut defining the interior 40 of attachment structure 18, while providing the ability to remove a finished panel 10 from out of mold assembly 44, as further discussed below. The portions of lifter 60 corresponding to first wall 20, second wall 28 and third wall 34 may be spaced apart from the adjacent portions of cavity 50, which include first cavity wall 52 second cavity wall 54, by the thickness desired for such walls 20, 28 and 34, respectively and may further define areas that are closer to the respective cavity wall 52 or 54 to give the desired shape and thickness for supporting wall segments 24 and 36.

A first set of pins 70 corresponding in size and configuration to the desired holes 26 extending within supporting wall segment 24 may extend from surface 66 of lifters 60. Pins 70 may be sized to extend into contact with corresponding first cavity wall 52 to form through holes 26, as shown in FIGS. 1 and 2, or may be configured to be spaced apart from wall 52 to form blind holes, such as holes 126 in FIGS. 5 and 6. The pins 70 extend along the first direction 27, which is generally parallel to an adjacent edge 51 of cavity 50 formed along the intersection of major surface 48 and cavity wall 52. In a variation, cavity may be in the shape of a cylindrical or conical section corresponding to the cylindrical or conical attachment features described above. Such a lifter can be in the form of a cam-action lifter that twists on a Z-axis to allow removal of attachment feature 18 therefrom. Such a variation may include a mold cavity that defines only a single wall, with a corresponding single wall formed on lifter. Pins generally similar to pins 70 may extend from the lifter wall in a manner that permits rotation thereof to remove the pins from the resulting holes, such as by being aligned with a vector of rotation of the lifter.

Figure 9:
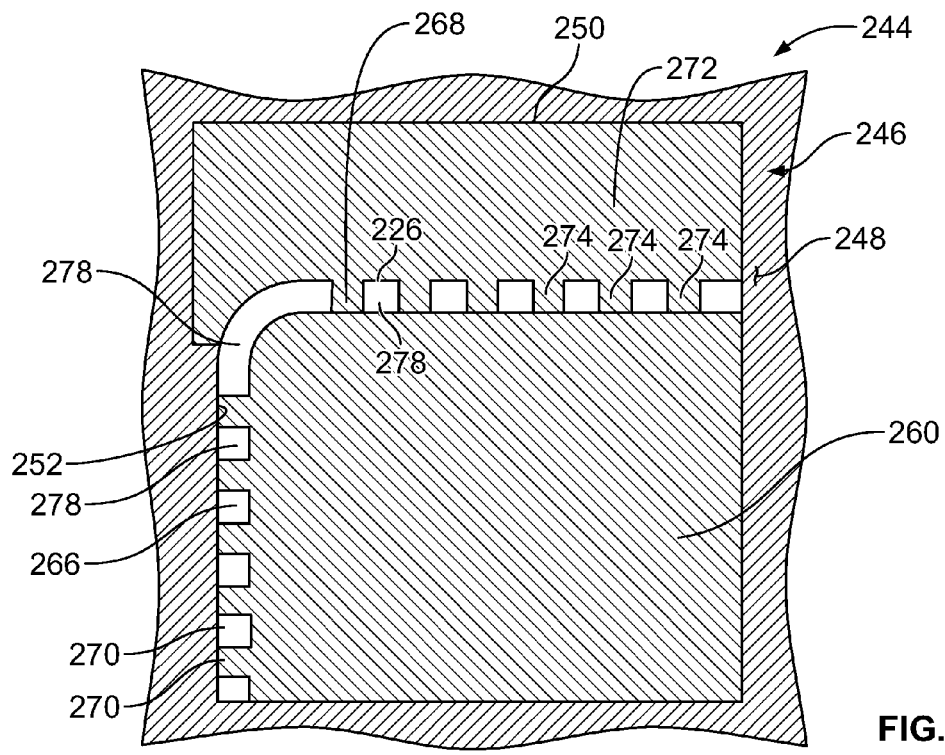
FIG. 9 is a cross-sectional view of a variation of a mold portion that can be used to make a vehicle interior panel having a variation of an attachment structure extending from a surface thereof.

A variation of mold assembly 244, a portion of which is shown in FIG. 9 includes a cavity 250 defining first cavity wall 252 sized to receive a first lifter 260 therein, in a manner similar to that which is discussed above with respect to FIGS. 7 and 8. Cavity 250 may further be sized to receive a second lifter 272, which defines the second wall 254 that is configured to correspond to the portion of third wall 34 on an exterior 42 of attachment structure 18. Second lifter 272 may also be moveable in and out of cavity 250 to further help provide for a removal of a finished panel 10 from out of mold assembly 244. Second lifter 272 may include a second set of pins 274 that extend into contact with surface 268 of first lifter 260. Second pins 274 can be configured to define, for example holes 38 in an attachment structure 18, as shown above in FIGS. 1 and 2. Second lifter 272 may be moveable with respect to first mold portion 246 by an associated actuator (not shown) that may be rotatable or angled to provide for lateral movement of lifter 272 away from first lifter 260 during removal of panel 10 therefrom.

Figure 10:
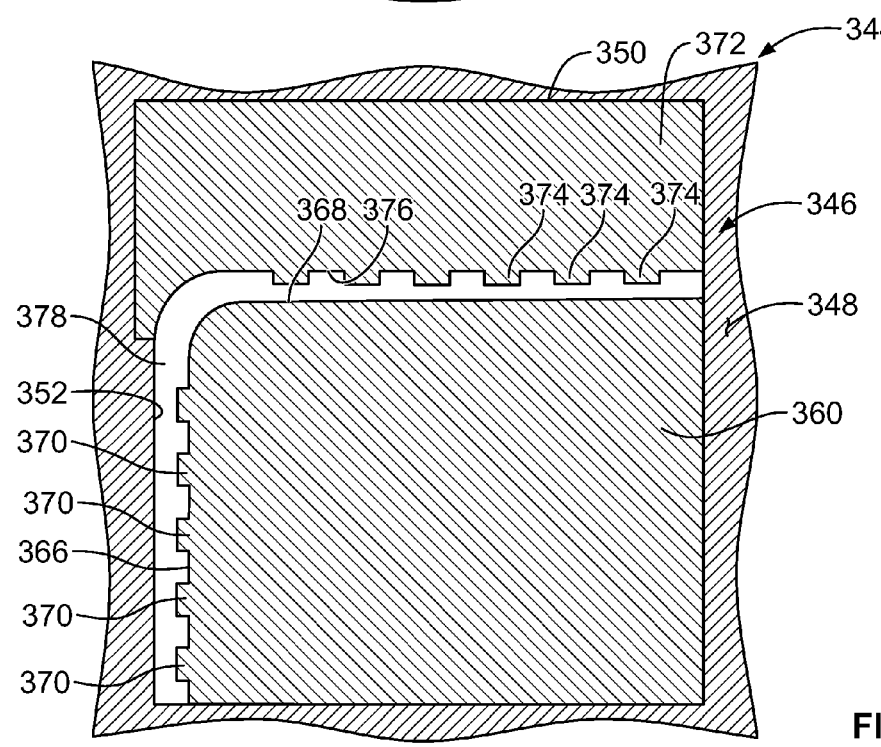
FIG. 10 is a cross-sectional view of a further variation of a mold portion that can be used to make a vehicle interior panel having another variation of an attachment structure extending from a surface thereof.

A further variation of a mold assembly 344 is shown in FIG. 10. Mold assembly 344 may be generally similar to mold assembly 244, discussed above with respect to FIG. 9, but may include first pins 370 and second pins 374 which are configured to extend to a position remote from the associated surfaces 352 and 354 so as to form blind holes 126 and 138, such as those shown in FIGS. 5 and 6. Pins 70 in mold assembly 44, as shown in FIGS. 7 and 8 may have pins configured similarly to those of mold assembly 344 to achieve a single set of blind holes similar to holes 126 in attachment structure 118 of FIGS. 5 and 6.

Figure 7:
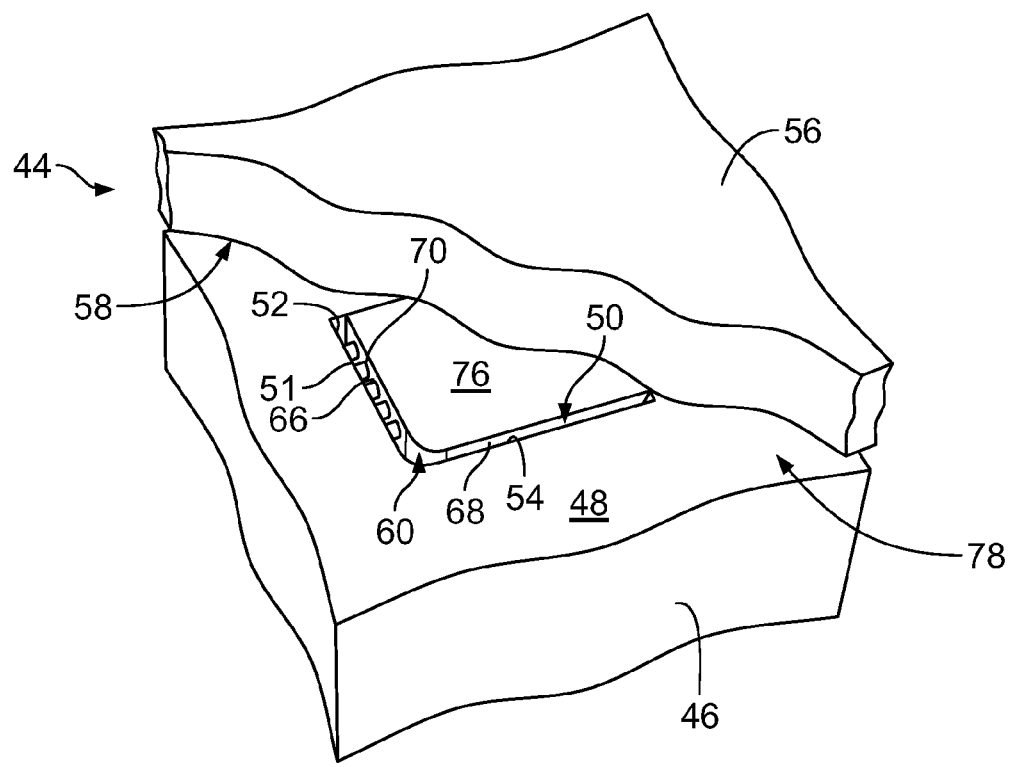
FIG. 7 is a perspective view of a portion of a mold that can be used to make a vehicle interior panel having an attachment structure extending from a surface thereof.

A method for making a panel 10 including an attachment structure 18 (or an attachment structure 118 as shown in FIGS. 5 and 6, or any of the other variations of attachment structures described herein) can include assembling an appropriate variation of a mold assembly, such as mold assembly 44, shown in FIGS. 7 and 8. Such assembly can include positioning of first mold portion 46 with respect to second mold portion 56 such that the respective major surfaces 48 and 58 are spaced apart to define the desired thickness of substrate 12. The assembly of mold assembly 44 can further include positioning of lifter 60 within cavity 50 such that surface 76 of lifter 60 is generally coplanar with major surface 48 of first mold portion 46, and accordingly, appropriately spaced apart from major surface 58 of second mold portion 56.

Subsequently, molten plastic can be injected, using appropriate injection molding machinery, into so as to substantially fill the negative space 78 defined within mold assembly 44, including between major surfaces 48 and 58 as well as between lifter 60 and cavity 50. As such, the molten plastic injected into the negative mold space 78 can take its desired shape of panel 10, including that of substrate 12 and attachment structure 18, as described above. Once the appropriate amount of molten plastic is injected into negative mold space 78 the molten plastic is allowed to cool within mold assembly 44 such that it hardens into the desired shape of panel 10, as imparted by the negative mold space 78. In particular the molten plastic injected into the portion of negative mold space 78 between cavity 50 and lifter 60 and around pins 70 defines second wall 28 including holes 26 therethrough. In variations of manufacturing methods involving the above-described variations of mold assembly, including mold assembly 244 and 344 shown respectively in FIGS. 9 and 10, the molten plastic injected into the negative mold space 78 between first lifter 60 and second lifter 72 including around second pins 74 can define holes 38 in wall 34, as shown in FIG. 2, or blind holes 138, as shown in FIGS. 5 and 6.

Figure 11:
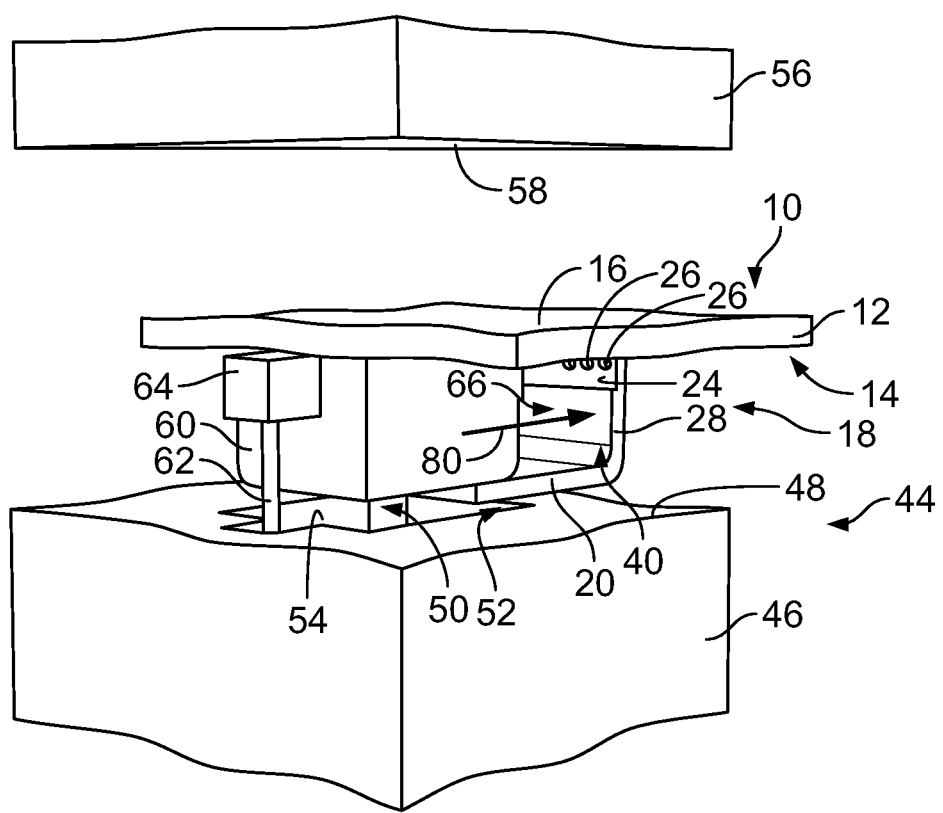
FIG. 11 is a perspective view of the mold portion of FIGS. 7 and 8, shown during a step of manufacturing a vehicle interior panel having an attachment structure extending from a surface thereof.

After an appropriate amount of time for the cooling of the molten plastic, mold assembly 44 may be disassembled as to remove the finished panel 10 or 110 therefrom. Such disassembly includes movement of second mold portion 56 away from first mold portion 46 to expose exterior surface 16 of panel 10. Lifter 60 can then be moved by lifter actuator 62 from out of cavity 50, as shown in FIG. 11. Lifter 60 can be moved by at least by a distance corresponding to the height of attachment structure 18 to allow for movement of panel 10 in a direction 80 corresponding to the direction in which pins 70 extend into holes 26 so as to remove lifter 60 from cavity 50, thereby releasing panel 10 from mold assembly 44. In variations of such a method involving an assembly 144 or 244, as shown in FIGS. 9 and 10 and including a second lifter 272 or 372 both first lifter 260 or 360 and second lifter 272 or 372 can both be moved from out of the respective cavity 250 or 350 with second lifter 272 or 372 additionally moving laterally so as to remove second pins 274 or 374 from the corresponding holes 38 or 138, thereby allowing panel 10 or 110 to be moved in a direction similar to direction 80 shown in FIG. 11 to move attachment feature 18 or 118 off of lifter 60 and to remove the finished panel 10 or 110 from out of the corresponding mold assembly 44 or 144.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle interior panel, comprising:
   a substrate having an interior surface and an exterior surface; and
   an attachment structure extending integrally from the interior surface of the substrate and including:
      a first wall spaced apart from the substrate and having an attachment opening therethrough; and
      a supporting wall segment adjacent the substrate and having a plurality of holes therein extending in a first direction generally parallel with the interior surface.

2. The vehicle interior panel of claim 1, wherein the attachment structure is one of a plurality of attachment structures, each attachment structure extending integrally from the interior surface of the substrate and including:
   a first wall spaced apart from the substrate and having an attachment opening therethrough; and
   a supporting wall segment adjacent the substrate and having a plurality of holes therein extending in a first direction generally parallel with the interior surface.

3. The vehicle interior panel of claim 1, wherein the attachment structure is injection-molded with the substrate so as to extend integrally therefrom.

4. The vehicle interior panel of claim 1, wherein the attachment structure further includes a second wall extending away from the first wall toward the substrate and integrally joining with the supporting wall segment such that the supporting wall segment and the second wall at least partially space the first wall away from the substrate.

5. The vehicle interior panel of claim 4, wherein the supporting wall segment has a first thickness, and the second wall has a second thickness, the first thickness being thinner than the second thickness.

6. The vehicle interior panel of claim 1, wherein the plurality of holes extend through the supporting wall segment.

7. The vehicle interior panel of claim 1, wherein the plurality of holes are blind holes extending partially through the supporting wall segment.

8. The vehicle interior panel of claim 1, wherein the supporting wall segment is a first supporting wall segment, the attachment structure further including a second supporting wall segment extending away from the first supporting wall segment adjacent the substrate and having a plurality of holes therein extending in a second direction generally parallel with the interior surface.

\* \* \* \* \*